March 26, 1935. M. F. GUTERMUTH 1,995,885
DISTRIBUTING VALVE
Original Filed Jan. 30, 1923

Inventor
Max F. Gutermuth
By Cornelius D. Ehret
his Attorney.

Patented Mar. 26, 1935

1,995,885

UNITED STATES PATENT OFFICE 1,995,885

DISTRIBUTING VALVE

Max F. Gutermuth, Darmstadt, Germany

Original application January 30, 1923, Serial No. 615,957. Divided and this application February 6, 1929, Serial No. 337,787. In Germany April 4, 1923

9 Claims. (Cl. 251—75)

My invention relates to distributing valves, and more particularly to distributing valves for controlling the flow of motive fluid to a motor.

My invention resides in valve structure of the reciprocating or sliding type comprising a valve seat having a restricted opening therein, and a slide valve operating on said seat and adapted to form with said opening a substantially stream line passage for permitting flow of a gaseous fluid, as steam, air or gas, therethrough at its critical velocity; and more particularly my invention resides in distributing valve structure of the piston type, wherein a restricted valve opening or port communicates with an annular diffuser passage for permitting maximum flow of fluid for a given stroke of the valve and accordingly limiting the size and mass of the valve.

My invention further resides in apparatus of the character hereinafter described and claimed.

In piston slide-valves of the type ordinarily used, the valve stroke may be reduced only by increasing the circumference of the piston, i. e. by increasing the diameter of the valve, or by the construction of multiple flow slots, as in the case of the so-called Penn slide valve, the valve construction being considerably involved and complicated in such cases.

The main object of my invention is to diminish to a considerable extent the size and mass of distributing valves, particularly of the slide or piston type, and to reduce their stroke or opening movement without increasing the actual pressure loss in the valve passage by more than the theoretical velocity head.

In distributing valves of previous construction, large losses have occurred due to throttling action at the valve openings. In my present invention, however, these losses are greatly diminished, and in addition, the size and lift of the valve decreased to a theoretical minimum by combining a substantially stream-line diffuser passage of a character hereinafter described with special valve structure. The valve and its cooperating valve seat are proportioned to form the beginning of a diverging diffuser passage, the valve passage being designed as a stream line passage to permit flow of a motive fluid, as steam, for example, therethrough at its critical velocity. The critical velocity of steam, for instance, ranges between 450 and 560 meters per second.

By such combination of a stream line diffuser passage with special valve structure designed on the basis of the critical velocity of the motive fluid, it is obvious that the theoretical minimum valve lift or opening may be attained. In accordance with such design, the size and mass of the valve may also be reduced, thereby reducing both inertia of the movable valve structure, and leakage by reason of the smaller valve opening. By my simplified valve structure, the loss of pressure of the working substance during its admission into the working-cylinder does not exceed the losses produced by small velocities of flow in ordinary distributing valves having relatively large dimensions.

For an illustration of some of the forms my invention may take, reference is had to the accompanying drawing, in which.

Figure 1:
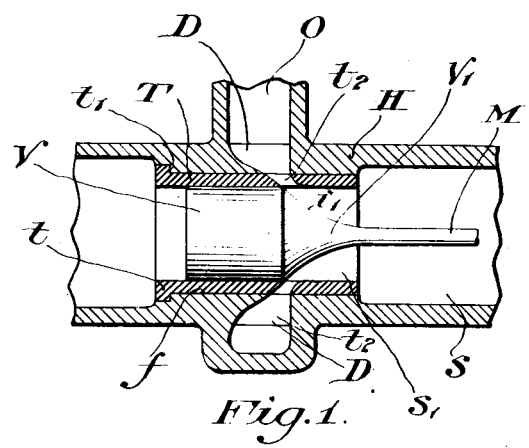
Fig. 1 is a view, partly in section, of one form of distributing valve.

Referring to Fig. 1, a housing or supporting structure H comprises a cylindrical bore extending therethrough and communicating at one end with a steam passage S. A valve seat or bushing T is mounted within housing H, and comprises a hollow cylindrical member fitted within the bore, and having an annular positioning shoulder $t$ at one end thereof for engaging a cooperating shoulder $t_1$ of housing H.

Valve seat T has an opening or port $t_2$, preferably substantially annular in shape, extending through the wall thereof, and adapted to be in communication with the steam passage S when the valve is open, and with an annular diverging passage D formed within the walls of housing H exteriorly and concentrically of the valve seat.

The diverging passage D, hereinafter referred to as the diffuser passage, communicates with an outlet passage O leading to a cylinder chamber, or equivalent.

Slidably mounted within valve seat T is a valve V of the piston type, having an operating member or stem M and a portion or extension $V_1$ diverging with respect to passage S. The diverging portion $V_1$ is so shaped that when valve V is in its fully opened position as illustrated in Fig. 1, there will be a continuous uninterrupted substantially stream line passage comprising converging passage $S_1$, a restricted passage or port $t_2$ in the valve seat, and the diverging or diffuser passage D, interconnecting steam passage S and outlet O. To the end that a change in direction of flow of the motive fluid may be attained without incurring appreciable losses, the surface $v_1$ of the piston body $V_1$ is formed as a surface of revolution by a line so shaped that no change of direction in flow occurs at the place of passage of the steam or motive fluid from the admission space into the diffuser space, i. e. at port $t_2$.

The cross-sectional area of the restricted portion of the diffuser passage $t_2$ is of such dimensions, and the shape of the passage such that flow of a gaseous fluid such as steam, air or gas, will pass therethrough at the critical velocity of that particular fluid when valve V is in its opened position. The diffuser passage D gradually diverges or increases in cross-sectional area as it extends from port $t_2$, said port forming, together with the diffuser passage D, the diverging portion $V_1$ of the valve, and the wall of the valve seat, a continuous substantially stream line passage. The valve opening or port $t_2$ is opened or closed in accordance with reciprocatory movement of valve V, the stroke of valve V, as well as its diameter, being reduced to a minimum by utilizing the critical velocity of fluid flow.

The above described valve structure is adapted to be used in combination with uniflow cylinders having exhaust slots, the construction of uniflow cylinders being well known in the fluid motor art.

Figure 2:
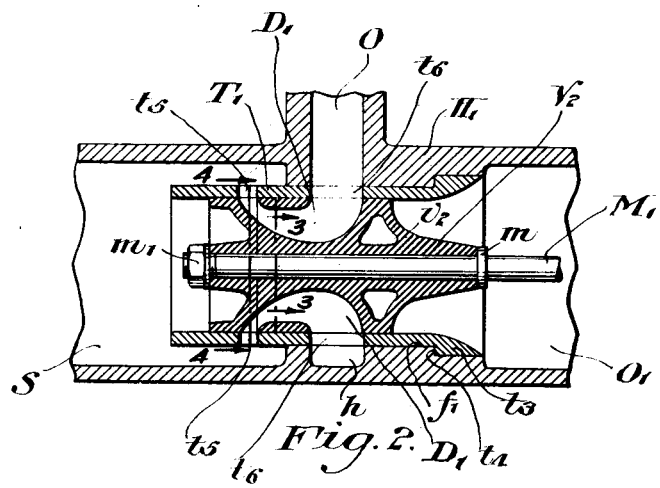
Fig. 2 is a view, partly in section, of another form of distributing valve.
Figure 3:
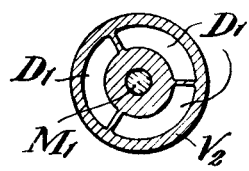
Fig. 3 is a sectional view on line 3—3 of valve structure shown in Fig. 2.
Figure 4:
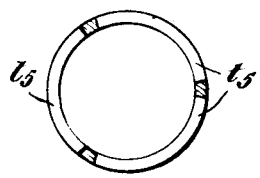
Fig. 4 is a sectional view on line 4—4 of valve structure shown in Fig. 2.

Another form of distributing valve embodying the above principles is illustrated in Fig. 2, wherein a housing $H_1$, as in the previous instance, comprises a circular bore extending therethrough. A cylindrical valve seat $T_1$ is disposed within the bore, and comprises an annular positioning shoulder $t_3$ in engagement with shoulder $t_4$ of housing $H_1$. Valve seat $T_1$ has a pair of substantially annular openings or ports $t_5$ and $t_6$ extending through the walls thereof, and in communication with a steam passage S and an outlet passage O respectively. Port $t_6$ communicates by way of an annular passage or recess $h$ in the wall of housing $H_1$ with outlet O.

A valve member $V_2$ is seated within the cylindrical valve seat $T_1$, and comprises a piston-like member adapted for reciprocatory movement with respect to its seat. Valve $V_2$ comprises an operating member or stem $M_1$ extending longitudinally of the valve member and secured thereto as by a shoulder or collar $m$ at one end of the valve and a securing nut $m_1$ threaded to the end of member $M_1$ and engaging the other end of valve $V_2$. Comprised within valve $V_2$ is a substantially annular stream line diverging passage $D_1$, hereinafter referred to as the diffuser passage, and during open position of the valve, as illustrated in Fig. 2, extends from the valve seat opening $t_5$ (the cross-section of opening $t_5$ coinciding with the restricted portion of diffuser passage $D_1$ communicating therewith), to the valve seat opening $t_6$, which is of considerably greater width than opening $t_5$, and coincides with the widest part of the diffuser passage communicating therewith.

In the type of valve illustrated in Fig. 2, the valve seat $T_1$, as well as a portion of valve $V_2$, extends to the left appreciably beyond the bore referred to and into the steam passage S. Accordingly, that part of the valve and valve seat extending into the fresh steam passage will receive heat therefrom, and consequently the steam, or equivalent motive fluid, will receive a certain amount of heat from the steam passage while passing through the first part of the diffuser passage $D_1$, and accordingly will enter the cylinder or working chamber at higher temperature.

As contrasted with the valve shown in Fig. 1, wherein the diffuser passage in general is disposed exteriorly and circumferentially of the valve V, the diffuser passage $D_1$ in Fig. 2 is comprised substantially within valve $V_2$, and co-operates with two valve ports of different size, defining the restricted and widest openings of the diffuser passage respectively.

It will be particularly noted that in the construction illustrated in Fig. 2 wherein the diffuser passage is substantially comprised within the valve itself, the surrounding valve seat and housing may be smaller in diameter due to elimination of the diffuser passage therein. Accordingly, when valve $V_2$ is of large diameter, as in the case of large installations, incorporation of the diffuser passage within the valve proper effects considerable reduction in the mass and exterior dimensions of housing $H_1$, as would otherwise be the case if housing $H_1$ had the diffuser passage incorporated therein.

Valve $V_2$ is furthermore constructed so that it may control exhaust as well as admission of the motive fluid. That is, when valve $V_2$ has moved to the left so that the edge of surface $v_2$ has traversed port $t_6$, an exhaust passage is formed comprising port $t_6$ and the diffuser passage formed by the surface $v_2$ of the valve and the inner wall of the valve seat. The annular exhaust diffuser opens into the exhaust passage $O_1$.

As has been previously stated, the usual distributing valves for steam, air, and gas engines in general have the inherent disadvantage of large throttling losses caused by the fact that the maximum efficiency of the actual openings of the valves are not realized. Although diffusers have been previously used in connection with Venturi-meters and in the construction of section tubes for water turbines, etc., so far as I am aware, the use of a diffuser in connection with slide valves for steam, air or gas engines was not known prior to my invention.

The advantages attained by combining a distributing valve of the above described type with a diffuser passage, as previously stated, include limiting both the size and mass of the reciprocating member, as well as limiting the valve controlling movement or stroke to a theoretical minimum, from which it follows that the valve may complete its stroke within a comparatively small interval of time.

In other words, for a given pressure of steam for example, and for a given cross-sectional area of the valve opening, there will be maximum rate of flow of the steam through the valve passage. It accordingly follows that where the critical velocity of the fluid is attained, the valve opening or ports may be of the smallest theoretical size, and the stroke and diameter of the valve may be consequently reduced to a minimum, while at the same time high thermal efficiency is maintained.

By reducing the inertia of the valve and its stroke to a minimum, there will be an increase in mechanical efficiency as well as a reduction of thermal losses due to throttling, the last named losses being considerable in the case where the valve moves through an appreciable distance during its stroke.

As will be noted from the drawing, the valve in Fig. 1 completes its stroke within the extent of movement represented by the width of port $t_2$, and in Fig. 2 the total stroke is representative of the width of port $t_5$, and not port $t_6$ which represents the widest portion of the diffuser passage. In the case where valve $V_2$ controls both the admission and exhaust of the motive fluid, the extent of movement of the exhaust stroke is represented by the combined width of port $t_6$ and that part of the valve between $D_1$ and $v_2$.

It is to be understood that my invention is not limited to the specific forms hereinabove described, but may comprehend other forms embodying the above described principles and similar structure.

This application is a division of my copending application Serial No. 615,957, filed January 30, 1923.

What I claim is:

1. A distributing valve for a gaseous fluid as steam, air or gas comprising, in combination with a substantially cylindrical valve seat having a substantially annular opening therein, a piston-like valve member adapted to reciprocate within said cylindrical valve seat, said member having a surface adapted to form with said valve seat and the wall of the annular opening in the valve seat a portion of the wall of a continuous substantially stream line fluid passage increasing in cross-sectional area from said annular opening.

2. Distributing valve structure comprising a casing having a bore therethrough and a substantially annular passage communicating therewith, a substantially cylindrical valve seat disposed within said bore and having a substantially annular opening communicating with said passage, and a piston-like valve member adapted to reciprocate within said cylindrical seat, said valve member having a surface shaped to form a portion of the wall of a continuous fluid passage between said bore and said annular opening of progressively varying area.

3. A distributing valve comprising in combination with a housing having a bore and an annular recess therein, and a cylindrical valve seat disposed within said housing and having openings communicating with said bore and recess, respectively of a piston-like member adapted for reciprocatory movement within said valve seat, said member having a diverging passage therein adapted to form with said valve seat openings a substantially stream line diffuser passage extending from said bore to said annular recess.

4. Structure for controlling the flow of elastic fluid comprising, in combination, a cylindrical valve seat having an annular port therein, a piston-like valve member adapted to reciprocate within said valve seat, said valve member having a surface extending from adjacent the periphery of said valve member and diminishing in diameter longitudinally thereof, to form with said valve seat a portion of the wall of a substantially stream line passage of which said port in said valve seat is the portion having the least cross-sectional area normal to the direction of flow through the passage, said valve member in its movement axially of said valve seat opening and closing said port in said valve seat.

5. Structure for controlling the flow of elastic fluid comprising, in combination, a cylindrical valve seat having an annular port therein, a piston-like valve member adapted to reciprocate within said valve seat, said valve member having a surface extending from adjacent the periphery of said valve member and diminishing in diameter longitudinally thereof, to form with said valve seat a portion of the wall of a substantially stream line passage including said port in said valve seat and divergent therefrom, said valve member in its movement axially of said valve seat opening and closing said port in said valve seat.

6. A distributing valve structure including a substantially cylindrical valve seat having a substantially annular opening therein, a substantially cylindrical valve member disposed to reciprocate relative to said valve seat to open and close the opening therein, said valve structure including a substantially stream line fluid passage formed at least in part by a surface of said reciprocating valve member when in its open position and said annular opening and increasing in cross-sectional area from said opening.

7. A distributing valve structure including a substantially cylindrical valve seat having a substantially annular opening therein, a piston-like valve member disposed to reciprocate within said valve seat to open and close the opening therein, said valve structure including a fluid passage of progressively varying area and formed at least in part by a surface of said reciprocating valve member when in its open position and said annular opening, said annular opening constituting the most constricted portion of said passage.

8. A distributing valve structure comprising a casing having a bore therethrough and an annular passage communicating therewith, a substantially cylindrical valve seat disposed within said bore and having a substantially annular opening interconnecting said passage and said bore, a substantially cylindrical valve member disposed to reciprocate relative to said valve seat to open and close the opening therein, said valve structure including a substantially stream line fluid passage between said bore and said annular passage formed at least in part by a surface of said reciprocating valve member when in its open position and said annular opening and increasing in cross-sectional area from said opening.

9. A distributing valve structure including a substantially cylindrical valve seat having a substantially annular opening therein, a substantially cylindrical valve member disposed to reciprocate relative to said valve seat to open and close the opening therein, and a substantially stream line diffuser passage formed in said reciprocable valve member and forming with said annular opening a continuous substantially stream line passage.

MAX F. GUTERMUTH.